(12) United States Patent
Oyaizu et al.

(10) Patent No.: US 9,228,085 B2
(45) Date of Patent: Jan. 5, 2016

(54) RESIN COMPOSITION FOR REFRIGERANT-TRANSPORTING HOSE AND METHOD OF PRODUCING THE RESIN COMPOSITION, AND REFRIGERANT-TRANSPORTING HOSE

(71) Applicant: TOKAI RUBBER INDUSTRIES, LTD., Komaki-shi, Aichi (JP)

(72) Inventors: Naoki Oyaizu, Komaki (JP); Kazutaka Katayama, Komaki (JP); Yukinori Wakazono, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 264 days.

(21) Appl. No.: 13/665,421

(22) Filed: Oct. 31, 2012

(65) Prior Publication Data

US 2013/0056107 A1 Mar. 7, 2013

Related U.S. Application Data

(63) Continuation of application No. PCT/JP2011/079747, filed on Dec. 21, 2011.

(30) Foreign Application Priority Data

Feb. 25, 2011 (JP) .................................. 2011-039661

(51) Int. Cl.
*B32B 1/08* (2006.01)
*C08L 77/06* (2006.01)
(Continued)

(52) U.S. Cl.
CPC ............. *C08L 77/06* (2013.01); *B60H 1/00571* (2013.01); *F16L 11/085* (2013.01);
(Continued)

(58) Field of Classification Search
CPC .............. B32B 1/08; C08L 2205/02–2205/03; C08L 77/06; F16L 11/04; F16L 11/085; Y10T 428/1393; Y10T 428/139; B60H 1/00571
USPC .......................... 428/36.91; 138/137; 525/179
See application file for complete search history.

(56) References Cited

U.S. PATENT DOCUMENTS 4,881,576 A 11/1989 Kitami et al.
5,147,944 A * 9/1992 Takeda ........................... 525/432
(Continued)

FOREIGN PATENT DOCUMENTS

JP S63-152787 A 6/1988
JP H4-86257 A 3/1992
(Continued)

OTHER PUBLICATIONS

Machine Translation JP 2004-181628, Jul. 2004.*
(Continued)

*Primary Examiner* — Erik Kashnikow
(74) *Attorney, Agent, or Firm* — Westerman, Hattori, Daniels & Adrian, LLP

(57) ABSTRACT

A resin composition for a refrigerant-transporting hose, including: a semi-aromatic polyamide resin (A) as a main component; an aliphatic polyamide resin (B); and an elastomer (C), in which the aliphatic polyamide resin (B) is dispersed in a phase formed of the semi-aromatic polyamide resin (A) and the elastomer (C), which is not crosslinked, is incorporated in the form of particles into the dispersed aliphatic polyamide resin (B). Thus, excellent refrigerant permeation resistance and acid resistance, and at the same time, for example, extrusion processability and flexibility, are obtained.

14 Claims, 1 Drawing Sheet

(51) Int. Cl.
  *F16L 11/08* (2006.01)
  *B60H 1/00* (2006.01)
(52) U.S. Cl.
  CPC ......... *C08L2205/02* (2013.01); *C08L 2205/03* (2013.01); *Y10T 428/139* (2015.01); *Y10T 428/1393* (2015.01)

(56) References Cited

U.S. PATENT DOCUMENTS

| | | | |
|---|---|---|---|
| 2005/0011571 A1* | 1/2005 | Wilson et al. | ................. 138/126 |
| 2007/0021558 A1* | 1/2007 | Shinohara et al. | .............. 525/66 |
| 2008/0014397 A1 | 1/2008 | Manai et al. | |
| 2008/0236695 A1 | 10/2008 | Takagi | |

FOREIGN PATENT DOCUMENTS

| | | | | |
|---|---|---|---|---|
| JP | 2000-120944 A | 4/2000 | | |
| JP | 2004-181628 A | 7/2004 | | |
| JP | 2004-197905 A | 7/2004 | | |
| JP | 2006-002130 A | 1/2006 | | |
| JP | 2006-077090 | * | 3/2006 | ............. C08L 21/00 |
| JP | 2006-212966 A | 8/2006 | | |
| JP | 2007-090563 A | 4/2007 | | |
| JP | 2008-18702 A | 1/2008 | | |
| JP | 2008-55640 A | 3/2008 | | |
| JP | 2008-248995 A | 10/2008 | | |

OTHER PUBLICATIONS

Notification of Transmittal of Translation of the International Preliminary Report on Patentabililty (Form PCT/IB/338) of International Application No. PCT/JP2011/079747 mailed Sep. 6, 2013 with Forms PCT/IB/373 and PCT/ISA/237. (6 pages).

Japanese Office Action dated Oct. 7, 2014, issued in corresponding Japanese Application No. 2011-039661 (w/English Translation) (4 pages).

Japanese International Search Report of PCT/JP2011/079747, mailing date Mar. 27, 2012.

Japanese Office Action dated Jun. 2, 2015 issued in corresponding Japanese Application No. 2011-039661; w/English translation (6 pages).

Partial English translation of JP 2006-2130A, which was previously submitted in the IDS dated Oct. 31, 2012.

* cited by examiner

RESIN COMPOSITION FOR REFRIGERANT-TRANSPORTING HOSE AND METHOD OF PRODUCING THE RESIN COMPOSITION, AND REFRIGERANT-TRANSPORTING HOSE

RELATED APPLICATION

This application is a continuation of International Application No. PCT/JP2011/079747, filed on Dec. 21, 2011, which claims priority to Japanese Patent Application No. 2011-039661, filed on Feb. 25, 2011, the entire contents of each of which are hereby incorporated by reference.

BACKGROUND OF THE INVENTION

1. Field of the Invention

The present invention relates to a resin composition for a refrigerant-transporting hose useful as a material for a refrigerant-transporting hose for a vehicle such as an automobile and a method of producing the resin composition, and a refrigerant-transporting hose formed of the resin composition.

2. Description of the Related Art

In recent years, in association with a tightened regulation on the release of ozone layer-depleting gases, a demand on the barrier property (refrigerant permeation resistance) of a refrigerant-transporting hose (air-conditioner hose) for an automobile or the like has become stringent. Accordingly, a resin having high crystallinity such as a polyamide has been used for a resin material for forming a resin layer of the refrigerant-transporting hose.

However, it has been known that a refrigerant for an automobile deteriorates owing to long-term use, which generates an acid. As an amide bond is apt to be decomposed by the acid, a situation in which the polyamide resin layer of the refrigerant-transporting hose is apt to be deteriorated is established. Bending the refrigerant-transporting hose whose polyamide resin layer has deteriorated results in cracking the hose. Moreover, the refrigerant-transporting hose for a vehicle such as an automobile is typically used in a high-temperature environment, and hence the decomposition of the amide bond by the acid is apt to be promoted.

Accordingly, in recent years, a semi-aromatic polyamide resin such as a polyamide 9T (PA9T), which is excellent in refrigerant permeation resistance and acid resistance, has been attracting attention as a material for the refrigerant-transporting hose (see, for example, Japanese Laid-open Patent Application No. 2006-212966 and Japanese Laid-open Patent Application No. 2007-90563).

However, when the semi-aromatic polyamide resin such as the PA9T is extruded upon production of the hose, the resin crystallizes (changes from a molten state to a solid state) immediately after the extrusion because the resin has a high melting point and a high crystallization rate. The resin layer thus extruded often has a weld line that can be visually observed. Accordingly, deformation (thickness deviation) at the time of its molding and local reductions in physical properties of the hose are apt to occur.

In addition, when the semi-aromatic polyamide resin such as PA9T is used as a hose material, for example, the following problems arise in addition to the problem concerning extrusion processability at the time of production of the hose as described above. The semi-aromatic polyamide resin has high rigidity and thus poor flexibility, and it is vulnerable to an impact at low temperature. The semi-aromatic polyamide resin is not suited for any application of the refrigerant-transporting hose owing to the problems, and hence its improvement has been demanded.

SUMMARY OF THE INVENTION

The present invention has been made in view of such circumstances, and an objective of the present invention is to provide a resin composition for a refrigerant-transporting hose having excellent refrigerant permeation resistance and acid resistance, and at the same time, having, for example, excellent extrusion processability and flexibility, a method of producing the resin composition, and a refrigerant-transporting hose.

In order to achieve this objective, in a first aspect, the present invention provides a resin composition for a refrigerant-transporting hose, including: the following component (A) as a main component; the following component (B); and the following component (C), in which the component (B) is dispersed in a phase formed of the component (A), and the component (C), which is not crosslinked, is incorporated in the form of particles into the dispersed component (B):

(A) a semi-aromatic polyamide resin;
(B) an aliphatic polyamide resin; and
(C) an elastomer.

Further, in a second aspect, the present invention provides a method of producing the resin composition for a refrigerant-transporting hose of the first aspect, the method including: kneading an aliphatic polyamide resin (B) and an elastomer (C) that is uncrosslinked to finely disperse the elastomer (C) in the aliphatic polyamide resin (B); and mixing the kneaded product and a semi-aromatic polyamide resin (A).

Further, in a third aspect, the present invention provides a refrigerant-transporting hose, including one or more constituent layers, in which at least one constituent layer thereof is formed of the resin composition for a refrigerant-transporting hose of the first gist.

That is, the inventors of the present invention have made extensive studies to solve the problems. In the process of the studies, the inventors of the present invention have conducted an investigation on the preparation of the resin composition for a refrigerant-transporting hose through the blending of the aliphatic polyamide resin (B) and the elastomer (C) for solving the problems concerning, for example, extrusion processability and flexibility while using the semi-aromatic polyamide resin (A) having excellent refrigerant permeation resistance and acid resistance as a main component. However, the results of the studies conducted by the inventors of the present invention have revealed that a desired effect is not obtained merely by blending these components. That is, when the aliphatic polyamide resin (B) is merely blended into the semi-aromatic polyamide resin (A), the aliphatic polyamide resin (B) plays a role similar to a lubricant owing to the blending because the aliphatic polyamide resin (B) has a low crystallization rate (low crystallization temperature). As a result of the foregoing, the resin composition becomes excellent in extrusion processability but does not sufficiently obtain flexibility. In addition, when the elastomer (C) is blended into the semi-aromatic polyamide resin (A) for obtaining flexibility, compatibility between the two components is poor and hence the elastomer (C) is hardly dispersed in the semi-aromatic polyamide resin (A). As a result, the refrigerant permeation resistance of the resin composition as a whole deteriorates owing to the poor dispersibility and the low refrigerant permeation resistance of the elastomer.

The inventors of the present invention have made further studies to solve these problems. As a result, the inventors have found the following. The aliphatic polyamide resin (B) and the elastomer (C) were kneaded to finely disperse the elastomer (C) in the aliphatic polyamide resin (B). After that, the kneaded product and the semi-aromatic polyamide resin (A) were mixed. As a result, a resin composition in which the dispersed state of each of the components (A) to (C) had a special structure, i.e., a resin composition in which the aliphatic polyamide resin (B) was dispersed in a phase formed of the semi-aromatic polyamide resin (A) and the elastomer (C), which is not crosslinked, was incorporated in the form of particles into the dispersed aliphatic polyamide resin (B) was prepared (see FIG. 1). When the preparation is performed as described above, the aliphatic polyamide resin (B) is dispersed in a good state in the phase of the semi-aromatic polyamide resin (A) by virtue of a good compatibility between the semi-aromatic polyamide resin (A) and the aliphatic polyamide resin (B). In addition, the elastomer (C) having flexibility is incorporated in the form of particles into the dispersed aliphatic polyamide resin dispersion. As a result, rigidity resulting from the semi-aromatic polyamide resin (A) is alleviated and hence the entirety of the resin composition becomes flexible. In addition, the elastomer (C) is incorporated in the form of particles into the aliphatic polyamide resin dispersion rich in refrigerant permeation resistance, and hence the low refrigerant permeation resistance of the elastomer (C) is covered and the refrigerant permeation resistance of the resin composition as a whole is secured. Therefore, when such resin composition is used as a material for forming the layer of a refrigerant-transporting hose, the extrusion processability and the flexibility can be improved without impairing the refrigerant permeation resistance and the acid resistance attributable to the semi-aromatic polyamide resin (A). Thus, the inventors have reached the present invention.

As described above, the resin composition for a refrigerant-transporting hose of the present invention is a resin composition containing a semi-aromatic polyamide resin as a main component, and containing an aliphatic polyamide resin and an elastomer, in which the aliphatic polyamide resin is dispersed in a phase formed of the semi-aromatic polyamide resin and the elastomer, which is not crosslinked, is incorporated in the form of particles into the dispersed aliphatic polyamide resin. Accordingly, the resin composition is excellent in refrigerant permeation resistance and acid resistance, and its effects such as extrusion processability and flexibility are improved.

In particular, when the elastomer is incorporated in the form of particles having an average particle diameter of 0.1 to 1 μm, the resin composition becomes additionally excellent in flexibility and the like without the impairment of its refrigerant permeation resistance.

In addition, when a production method involving kneading the aliphatic polyamide resin and the uncrosslinked elastomer to finely disperse the elastomer in the aliphatic polyamide resin, and mixing the kneaded product and the semi-aromatic polyamide resin is used to produce the resin composition for a refrigerant-transporting hose of the present invention, the resin composition for a refrigerant-transporting hose of the present invention in which the dispersed state of each component has a special structure as described above can be efficiently produced.

In addition, when at least one constituent layer of a refrigerant-transporting hose provided with one or more constituent layers is formed of the resin composition for a refrigerant-transporting hose of the present invention, the occurrence of a weld line as observed in a conventional semi-aromatic polyamide resin layer can be eliminated, and hence the problems of a conventional refrigerant-transporting hose provided with the semi-aromatic polyamide resin layer such as deformation (thickness deviation) at the time of molding and local reductions in physical properties of the hose can be solved. Further, the refrigerant-transporting hose can exhibit excellent performance as a refrigerant-transporting hose because the refrigerant-transporting hose becomes excellent in refrigerant permeation resistance and acid resistance, and at the same time, excellent in flexibility and the like.

DETAILED DESCRIPTION OF THE PREFERRED EMBODIMENTS

Next, an embodiment of the present invention is described.

A resin composition for a refrigerant-transporting hose (hereinafter, sometimes simply abbreviated as "resin composition") of the present invention is a resin composition containing the following component (A) as a main component, and containing the following components (B) and (C), in which the component (B) is dispersed in a phase formed of the component (A) and the component (C), which is not crosslinked, is incorporated in the form of particles into the dispersed component (B). The resin composition of the present invention becomes excellent in refrigerant permeation resistance and acid resistance, and at the same time, excellent in, for example, extrusion processability and flexibility because the dispersed state of each of the components (A) to (C) shows such special structure. It should be noted that the "main component" of the resin composition is a component that largely affects the characteristics of the resin composition as a whole, and in the present invention, its amount is meant to be larger than 50 wt % of the total composition. In addition, the following semi-aromatic polyamide resin (A) is obtained by substituting part of an aliphatic diamine or aliphatic dicarboxylic acid as a raw material for an aliphatic polyamide resin with an aromatic diamine or an aromatic dicarboxylic acid.

Figure 1:
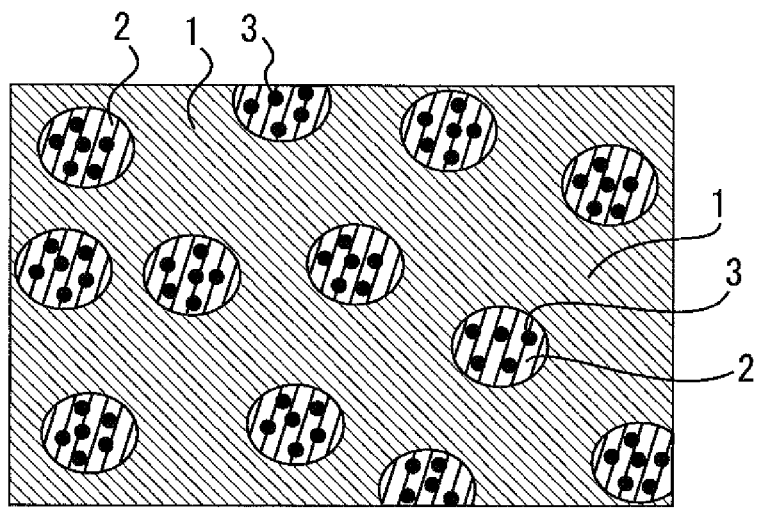
FIG. 1 is an explanatory diagram illustrating the dispersed state of each component in a resin composition for a refrigerant-transporting hose of the present invention in the composition.

(A) A semi-aromatic polyamide resin
(B) An aliphatic polyamide resin
(C) An elastomer In the resin composition, compatibility between the semi-aromatic polyamide resin (A) and the aliphatic polyamide resin (B) is high, and hence a borderline between the phases of both resins is hard to clearly observe in many cases. Strictly speaking, however, the semi-aromatic polyamide resin (A) forms a matrix phase (sea phase) and the aliphatic polyamide resin (B) forms an island phase (domain). Such sea-island structure can be identified by, for example, observation with a scanning probe microscope (SPM) and infrared absorption spectrum (IR) measurement. In addition, as described in the foregoing, the uncrosslinked elastomer (C) is incorporated in the form of particles into the island phase. It should be noted that the dispersed state of each of these components (A) to (C) in the resin composition is as illustrated in FIG. 1, and in the figure, reference numeral 1 represents the semi-aromatic polyamide resin, reference numeral 2 represents the aliphatic polyamide resin, and reference numeral 3 represents the elastomer. The resin composition of the present invention becomes additionally excellent in, for example, refrigerant permeation resistance, acid resistance, extrusion processability, and flexibility by forming such dispersed state.

In the resin composition of the present invention, the elastomer (C) is preferably incorporated as particles having an average particle diameter of 0.1 to 1 µm. That is because of the following reasons. When the average particle diameter of the elastomer (C) is lower than the range, there is a possibility that desired flexibility cannot be obtained. In contrast, when the average particle diameter is higher than the range, the refrigerant permeation resistance may be impaired. It should be noted that the average particle diameter of the elastomer (C) can be derived by, for example, observing the resin composition of the present invention with a scanning probe microscope (SPM), measuring many particle diameters of the elastomer (C), and calculating the average of the measured values.

The content of the elastomer (C) in the resin composition of the present invention is preferably 10 to 40 wt % of the total amount of the aliphatic polyamide resin (B) and the elastomer (C), and the content more preferably is in the range of from 20 to 30 wt %. That is because of the following reasons. When the content of the elastomer (C) is lower than the range, there is a possibility that desired flexibility cannot be obtained. In contrast, when the content is higher than the range, the refrigerant permeation resistance may be impaired.

In addition, the content of the semi-aromatic polyamide resin (A) in the resin composition of the present invention is preferably 60 to 90 wt % of the total amount of the resin composition, and the content more preferably is in the range of from 70 to 80 wt %. That is because of the following reasons. When the content of the semi-aromatic polyamide resin (A) is lower than the range, the refrigerant permeation resistance and the acid resistance may be impaired. In contrast, when the content is higher than the range, the extrusion processability and the flexibility may be impaired.

Next, each of the components (A) to (C) is specifically described.

That is, specific examples of the semi-aromatic polyamide resin (A) include a polyamide 4T (PA4T), a polyamide 6T (PA6T), a polyamide MXD6 (PAMXD6), a polyamide 9T (PA9T), a polyamide 10T (PA10T), a polyamide 11T (PA11T), a polyamide 12T (PA12T), and a polyamide 13T (PA13T). One kind of these semi-aromatic polyamides is used alone, or two or more kinds thereof are used in combination.

Further, specific examples of the aliphatic polyamide resin (B) include a polyamide 46 (PA46), a polyamide 6 (PA6), a polyamide 66 (PA66), a polyamide 92 (PA92), a polyamide 99 (PA99), a polyamide 610 (PA610), a polyamide 612 (PA612), a polyamide 11 (PA11), a polyamide 912 (PA912), apolyamide 12 (PA12), a copolymer of polyamide 6 and polyamide 66 (PA6/66), and a copolymer of polyamide 6 and polyamide 12 (PA6/12). One kind of these aliphatic polyamides is used alone, or two or more kinds thereof are used in combination.

Further examples of the elastomer (C) include a styrene-based elastomer, an olefin-based elastomer, a vinyl chloride-based elastomer, a polyester-based elastomer, a polyurethane-based elastomer, and a polyamide-based elastomer.

Specific examples of styrene-based elastomer include a styrene-butadiene-styrene block copolymer (SBS), a styrene-ethylene butylene-styrene block copolymer (SEBS), a styrene-isobutylene block copolymer (SIB), a styrene-isobutylene-styrene block copolymer (SIBS), and a styrene-ethylene propylene-styrene block copolymer (SEPS). Further, specific examples of olefin-based elastomer include a blend of an ethylene-propylene-diene rubber (EPDM) or an ethylene-propylene rubber (EPM), an ethylene-butene copolymer, an ethylene-α-olefin copolymer, and a reactor TPO. In addition, for example, the following modified polyolefin-based elastomer can also be used as the olefin-based elastomer. The modified polyolefin-based elastomer is obtained by chemically modifying a polymer side chain or polymer terminal of a polyolefin-based elastomer obtained by homopolymerization or copolymerization of an olefin or diene monomer such as ethylene, propylene, or butadiene, with maleic anhydride, silicone (silane), chlorine, an amine, an acrylic compound, an epoxy compound, or the like. In addition, the vinyl chloride-based elastomer is, for example, an elastomer obtained by partially crosslinking part of a product obtained by blending a PVC/rubber with a plasticizer. In addition, the polyester-based elastomer is, for example, a polybutylene terephthalate/polyether/polybutylene terephthalate copolymer. In addition, the polyurethane-based elastomer is, for example, a copolymer obtained by the reaction of an isocyanate and a polyol such as a polyether polyol, a polycarbonate polyol, or a polyester polyol. Further, the polyamide-based elastomer is, for example, a polyamide 6/polyether copolymer, a polyamide 12/polyether copolymer, or a polyamide 12/polyester copolymer.

In addition, one kind of these various elastomers is used alone, or two or more kinds thereof are used in combination. It should be noted that the various kinds of elastomers may be subjected to maleic anhydride modification or epoxy modification before their use as required so that the elastomers may be excellent in adhesiveness and processability.

It should be noted that the resin composition for a refrigerant-transporting hose of the present invention may be appropriately blended with, for example, a crosslinking agent (including a vulcanizing agent), carbon black, silica, an age resistor, a vulcanization accelerator, a vulcanizing aid, a processing aid, a plasticizer, a softening agent, an acid-receiving agent, an adhesive component (such as a resorcinol-based compound or a melamine-based compound), a colorant, or an antiscorching agent as required in addition to the respective components (A) to (C).

The resin composition for a refrigerant-transporting hose of the present invention can be prepared by, for example, kneading the aliphatic polyamide resin (B) and the uncrosslinked elastomer (C) with a biaxial kneader or the like at a temperature (200 to 250° C.) around the melting point of the aliphatic polyamide resin (B) (until the elastomer (C) shows a specific particle diameter) to finely disperse the elastomer (C) in the aliphatic polyamide resin (B), and mixing the kneaded product and the semi-aromatic polyamide resin (A). Although a method for the mixing with the semi-aromatic polyamide resin (A) is not particularly limited, the mixing can be performed by, for example, melting and mixing, at the time of producing of the hose, the kneaded product and the semi-aromatic polyamide resin (A) with a hose-producing extruder (such as a multilayer extruder manufactured by Research Laboratory of Plastics Technology Co., Ltd.) at a temperature (260 to 310° C.) around the melting point of the semi-aromatic polyamide resin (A). In addition, when the resin composition for a refrigerant-transporting hose of the present invention is blended with a material other than the components (A) to (C), the timing at which the material is blended is not particularly limited. However, for example, when a vulcanizing agent or the like for the elastomer (C) is blended, the material is caused to act on the elastomer (C) and hence the following procedure is typically adopted. The material is mixed into the elastomer (C) before the kneading with the aliphatic polyamide resin (B).

Figure 2:
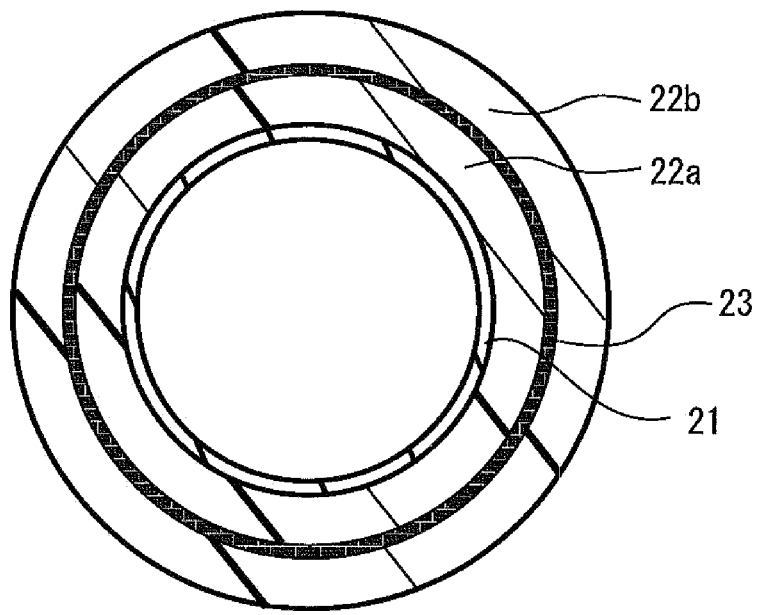
FIG. 2 is an explanatory cross-section view illustrating an example of the construction of a refrigerant-transporting hose of the present invention.

Next, a refrigerant-transporting hose of the present invention is described. The refrigerant-transporting hose of the present invention is, for example, such that a rubber layer 22a is formed on the outer peripheral surface of a tubular resin layer 21 to be brought into contact with a refrigerant and an outer surface rubber layer 22b is formed on its outer peripheral surface through a reinforcing layer 23 as illustrated in FIG. 2. In addition, in the refrigerant-transporting hose of FIG. 2, the resin layer 21 is formed of a vulcanized product of the resin composition for a refrigerant-transporting hose of the present invention described above.

A material for forming each of the rubber layers on the outer peripheral surface of the resin layer 21 (rubber layer 22a and outer surface rubber layer 22b) is not particularly limited. The material is, for example, a rubber material blended with a vulcanizing agent, carbon black, or the like, as appropriate. Examples of the rubber material include halogenated butyl rubbers such as a butyl rubber (IIR), a chlorinated butyl rubber (Cl-IIR), and a brominated butyl rubber (Br-IIR), an acrylonitrile-butadiene rubber (NBR), a chloroprene rubber (CR), an ethylene-propylene-diene rubber (EPDM), an ethylene-propylene rubber (EPM), a fluororubber (FKM), an epichlorohydrin rubber (ECO), an acrylic rubber, a silicone rubber, a chlorinated polyethylene rubber (CPE), and a urethane rubber. Of these, an ethylene-propylene-diene rubber (EPDM) is suitably used from the viewpoint of, for example, weatherability. It should be noted that carbon black, an age resistor, a vulcanizing agent, a vulcanization accelerator, a processing aid, a white filler, a plasticizer, a softening agent, an acid-receiving agent, a colorant, an antiscorching agent, or the like is appropriately blended into the material for each of the rubber layers as required.

In addition, the reinforcing layer 23 may be formed in the refrigerant-transporting hose of the present invention as illustrated in FIG. 2 as required. The reinforcing layer 23 is preferably interposed between the two rubber layers as illustrated in the figure because its function (hose pressure-resisting performance) is sufficiently exerted. The reinforcing layer 23 can be constructed as a reinforcing layer by, for example, plaiting a reinforcing yarn made of a polyethylene terephthalate (PET), a polyethylene naphthalate (PEN), an aramid, a polyamide (nylon), a vinylon, a rayon, a metal wire, or the like through spiral plaiting, knit plaiting, braid plaiting, or the like.

It should be noted that the refrigerant-transporting hose of the present invention is only required to be a refrigerant-transporting hose having one or more constituent layers, at least one of which is formed of the resin composition for a refrigerant-transporting hose of the present invention, and is not limited to the construction illustrated in FIG. 2. In addition, when the refrigerant-transporting hose has a plurality of rubber layers as illustrated in FIG. 2, the respective rubber layers may be formed with the same rubber base material. It should be noted that an adhesive may be applied between the respective layers for improving the interlayer adhesiveness of the refrigerant-transporting hose.

Next, a method of producing the refrigerant-transporting hose of the present invention is described. That is, first, the resin composition of the present invention serving as a material for the resin layer 21, and rubber compositions serving as materials for the rubber layers (the rubber layer 22a and the outer surface rubber layer 22b) are each prepared. Then, the tubular resin layer 21 is formed by extruding the resin composition of the present invention serving as a material for the resin layer 21 into a hose shape onto a mandrel. Next, the rubber layer 22a is formed by extruding the material for the rubber layer 22a onto the outer peripheral surface of the resin layer 21. After that, the reinforcing layer 23 is formed by subjecting the outer peripheral surface of the layer 22a to, for example, braid plaiting with a reinforcing yarn. Further, the outer surface rubber layer 22b is formed by extruding the rubber composition onto the outer peripheral surface of the reinforcing layer 23. Then, the resultant is vulcanized under predetermined conditions (preferably 170° C.×30 to 60 minutes). After that, the mandrel is taken out. Thus, the refrigerant-transporting hose in which the rubber layer 22a is formed on the outer peripheral surface of the tubular resin layer 21 and the outer surface rubber layer 22b is formed on its outer peripheral surface through the reinforcing layer 23 as illustrated in FIG. 2 can be produced.

In the refrigerant-transporting hose of the present invention, a hose inner diameter preferably is in the range of from 5 to 40 mm. In addition, the thickness of the resin layer 21 is preferably in the range of from 0.02 to 2 mm, particularly preferably 0.15 to 0.2 mm, the thickness of the rubber layer 22a is preferably in the range of from 0.5 to 5 mm, particularly preferably 1.5 to 2 mm, and the thickness of the outer surface rubber layer 22b is preferably in the range of from 0.5 to 2 mm, particularly preferably 1 to 1.5 mm.

EXAMPLES

Next, examples are described together with comparative examples, provided that the present invention is not limited to these examples.

Example 1

Preparation of Resin Composition

A polyamide 6 (PA6) as an aliphatic polyamide resin (Nylon 6 1030B manufactured by UBE INDUSTRIES, LTD.) and an elastomer (modified ethylene-α-olefin copolymer, TAFMER MH7020 manufactured by Mitsui Chemicals, Inc.) were prepared, and were then blended so that the content of the elastomer was 27 wt % of the total amount of the aliphatic polyamide resin and the elastomer. The elastomer was finely dispersed in an uncrosslinked state in the aliphatic polyamide resin by kneading the blend with a biaxial kneader (manufactured by JSW) at 230° C. for 4 to 5 minutes. 10 weight percent of the kneaded product thus obtained and 90 wt % of a PA9T as a semi-aromatic polyamide resin (GENESTAR N1001A manufactured by KURARAY CO., LTD.) were melted and mixed with an extruder (manufactured by Research Laboratory of Plastics Technology Co., Ltd.) at 310° C. Thus, a resin composition was prepared. It should be noted that observation with a scanning probe microscope (SPM) and infrared absorption spectrum (IR) measurement conducted on the resin composition thus prepared confirmed that the aliphatic polyamide resin was dispersed in a phase formed of the semi-aromatic polyamide resin and the elastomer was incorporated in the form of particles into the dispersed aliphatic polyamide resin as illustrated in FIG. 1. In addition, an average was calculated by measuring the particle diameters of several tens of particles of the elastomer. The resulting average particle diameter was 1 μm.

<Production of Hose>

A tubular resin layer (having a thickness of 0.15 mm) was formed by melt-extruding the resin composition prepared in the foregoing into a hose shape onto a mandrel (having an outer diameter of 12 mm) made of a TPX (manufactured by Mitsui Chemicals, Inc.). Next, a rubber layer (having a thickness of 1.6 mm) was formed by extruding a rubber composition using an EPDM as a rubber component onto the outer peripheral surface of the resin layer. Next, a reinforcing layer was formed by subjecting the outer peripheral surface of the hose body to braid plaiting with a PET yarn. Further, an outer surface rubber outer layer (having a thickness of 1.0 mm) was formed by extruding a rubber composition using the EPDM as a rubber component onto the outer peripheral surface of the reinforcing layer. Then, the resultant was vulcanized at 170° C. for 30 minutes. After that, the mandrel was taken out of the laminated hose body and then the continuous molded article was cut. Thus, a hose was produced (see FIG. 2).

Example 2

A resin composition was prepared in the same manner as in Example 1 except that: the blending amount of the semi-aromatic polyamide resin used in the preparation of the resin composition of Example 1 was changed to 80 wt % of the total amount of the resin composition; and the blending amount of the aliphatic polyamide resin (kneaded product) in which the elastomer had been finely dispersed was changed to 20 wt % of the total amount of the resin composition. Then, a hose was produced in the same manner as in Example 1 with the resin composition.

Example 3

A resin composition was prepared in the same manner as in Example 1 except that: the blending amount of the semi-aromatic polyamide resin used in the preparation of the resin composition of Example 1 was changed to 70 wt % of the total amount of the resin composition; and the blending amount of the aliphatic polyamide resin (kneaded product) in which the elastomer had been finely dispersed was changed to 30 wt % of the total amount of the resin composition. Then, a hose was produced in the same manner as in Example 1 with the resin composition.

Example 4

A resin composition was prepared in the same manner as in Example 1 except that: the blending amount of the semi-aromatic polyamide resin used in the preparation of the resin composition of Example 1 was changed to 60 wt % of the total amount of the resin composition; and the blending amount of the aliphatic polyamide resin (kneaded product) in which the elastomer had been finely dispersed was changed to 40 wt % of the total amount of the resin composition. Then, a hose was produced in the same manner as in Example 1 with the resin composition.

Comparative Example 1

A resin composition was prepared in the same manner as in Example 1 except that: the blending amount of the semi-aromatic polyamide resin used in the preparation of the resin composition of Example 1 was changed to 50 wt % of the total amount of the resin composition; and the blending amount of the aliphatic polyamide resin (kneaded product) in which the elastomer had been finely dispersed was changed to 50 wt % of the total amount of the resin composition. Then, a hose was produced in the same manner as in Example 1 with the resin composition.

Comparative Example 2

Only the PA9T as the semi-aromatic polyamide resin was used instead of the resin composition of Example 1. Then, a hose was produced in the same manner as in Example 1 with the PA9T.

Comparative Example 3

A resin composition was prepared in the same manner as in Example 1 except that instead of the aliphatic polyamide resin (kneaded product) in which the elastomer had been finely dispersed used in the preparation of the resin composition of Example 1, only the elastomer was blended at a ratio of 10 wt % of the total amount of the resin composition. Then, a hose was produced in the same manner as in Example 1 with the resin composition.

Comparative Example 4

A resin composition was prepared in the same manner as in Example 1 except that instead of the aliphatic polyamide resin (kneaded product) in which the elastomer had been finely dispersed used in the preparation of the resin composition of Example 1, only the aliphatic polyamide resin was blended at a ratio of 10 wt % of the total amount of the resin composition. Then, a hose was produced in the same manner as in Example 1 with the resin composition.

Comparative Example 5

In order for the semi-aromatic polyamide resin, the aliphatic polyamide resin, and the elastomer used in the preparation of the resin composition of Example 1 to be simultaneously blended with their blending ratios identical to those of Example 1, the components were melted and mixed with an extruder (manufactured by Research Laboratory of Plastics Technology Co., Ltd.) at 290° C. Thus, a resin composition was prepared. It should be noted that observation with a scanning probe microscope (SPM) and infrared absorption spectrum (IR) measurement conducted on the resin composition thus prepared confirmed that in the resin composition, the elastomer was in a state of being incorporated in the form of particles having an average particle diameter of 1 to 10 μm. Then, a hose was produced in the same manner as in Example 1 with the resin composition.

The resin compositions (and hoses) of the examples and the comparative examples thus obtained were evaluated for respective characteristics in accordance with the following criteria. Table 1 below shows the results together.

<Extrusion Processability>

A resin composition melt-extruded into a hose shape onto a mandrel at the time of the production of a hose was visually observed, and was then evaluated as x when a weld line and thickness deviation were observed, as Δ when thickness deviation was not observed but a weld line was observed, or as ○ when neither a weld line nor thickness deviation was observed.

<Flexibility>

A hose was wound around a tubular cylinder (mandrel) having a diameter of 200 mm and was then evaluated for its flexibility on the basis of the extent to which the hose was wound. That is, the hose was evaluated as ○ when the resin layer of the hose did not kink (buckle) as a result of the winding, and was evaluated as x when the resin layer kinked (buckled) as a result of the winding.

<Refrigerant Permeation Resistance>

12 grams of an alternative chlorofluorocarbon gas (HFC-134a) were sealed in a hose having a hose length of 500 mm and then the openings at both ends of the hose were plugged. After that, the hose was left to stand in an oven at 100° C. Then, the weight reduction of the hose was plotted against time, and then an alternative chlorofluorocarbon gas permeation amount per day with respect to the permeation area of the hose (HFC-134a permeation coefficient, mg·mm/cm$^2$·day) was calculated from the gradient of the plot. Then, the value measured for the alternative chlorofluorocarbon gas permeation amount in the hose of Comparative Example 2 whose resin layer was formed only of the PA9T as the semi-aromatic polyamide resin was defined as 100, and then the value measured for the alternative chlorofluorocarbon gas permeation amount in each hose was converted into an index relative to that value. Then, a hose for which the refrigerant permeation resistance evaluation index was 150 or less was evaluated as ○, and a hose for which the index exceeded 150 was evaluated as x.

TABLE 1

|  | Example | | | | Comparative Example | | | | |
| --- | --- | --- | --- | --- | --- | --- | --- | --- | --- |
|  | 1 | 2 | 3 | 4 | 1 | 2 | 3 | 4 | 5 |
| Extrusion processability | ○ | ○ | ○ | ○ | ○ | x | Δ | ○ | x |
| Flexibility | ○ | ○ | ○ | ○ | ○ | x | ○ | x | ○ |
| Refrigerant permeation resistance | ○ | ○ | ○ | ○ | x | ○ | x | ○ | x |

The foregoing results show that each of the products of the examples is excellent in refrigerant permeation resistance, and at the same time, excellent in extrusion processability and flexibility.

In contrast, in Comparative Example 1, the ratio of the semi-aromatic polyamide resin in the materials for the resin layer was excessively small as compared with those of the examples. As a result, the comparative example had poor refrigerant permeation resistance. In Comparative Example 2, the material for the resin layer was the semi-aromatic polyamide resin alone. As a result, the comparative example had poor extrusion processability and flexibility. In Comparative Example 3, the material for the resin layer was a material obtained by directly blending the elastomer into the semi-aromatic polyamide resin. As a result, the dispersibility of the elastomer in the semi-aromatic polyamide resin was bad and hence the comparative example had poor refrigerant permeation resistance. In Comparative Example 4, the material for the resin layer was a material obtained by blending the aliphatic polyamide resin into the semi-aromatic polyamide resin. Unlike the examples, however, the elastomer was not finely dispersed in the aliphatic polyamide resin. As a result, the comparative example had poor flexibility. In Comparative Example 5, the materials for the resin layer were identical to those of each of the examples. Unlike the examples, however, all the materials were simultaneously blended, and hence a nonuniform state different from the dispersed state illustrated in FIG. 1 was established. As a result, the comparative example had poor extrusion processability and refrigerant permeation resistance.

Although the semi-aromatic polyamide resin, the aliphatic polyamide resin, and the elastomer used as materials for the resin layer in each of the examples were PA9T, PA6, and olefin-based elastomer, respectively, an experiment confirmed that even when a semi-aromatic polyamide resin, an aliphatic polyamide resin, and an elastomer other than the foregoing were used, a hose produced with a resin composition prepared according to the same procedure as that of each of the examples provided excellent performance as a hose for transporting a refrigerant as in the examples.

It should be noted that the above-mentioned examples, which have shown specific embodiments in the present invention, are merely examples and should not be construed as being limitative. In addition, all modifications belonging to the scope equivalent to the scope of the claims fall within the scope of the present invention.

The refrigerant-transporting hose of the present invention is used as a transporting hose for a refrigerant such as carbon dioxide, a chlorofluorocarbon, an alternative chlorofluorocarbon, or propane to be used in an air conditioner radiator or the like. It should be noted that the refrigerant-transporting hose can be used not only for an automobile but also for any other transportation machine (e.g., an industrial transportation vehicle such as an airplane, a fork lift, a digger, or a crane, or a railway vehicle) or the like.

What is claimed is:

1. A refrigerant-transporting hose, comprising one or more constituent layers,
   wherein at least an innermost layer of the constituent layers is formed of a resin composition containing a semi-aromatic polyamide resin (A) as a main component, an aliphatic polyamide resin (B) and an elastomer (C),
   wherein the aliphatic polyamide resin (B) is dispersed in a phase formed of the semi-aromatic polyamide resin (A),
   wherein the elastomer (C), which is not crosslinked, is incorporated in the form of particles into the dispersed aliphatic polyamide resin (B), and
   wherein the semi-aromatic polyamide resin (A) is a polyamide 9T (PA9T).

2. A refrigerant-transporting hose according to claim 1, wherein the layer formed of the resin composition is an inner layer of the hose, and the hose further comprises a rubber layer as an outer layer.

3. A refrigerant-transporting hose according to claim 1, wherein the layer formed of the resin composition is an inner layer, and the hose further comprises a layer formed of an ethylene-propylene-diene rubber as an outer layer.

4. A method of producing a refrigerant-transporting hose according to claim 1, the method comprising:
   kneading an aliphatic polyamide resin (B) and an elastomer (C) that is not crosslinked to finely disperse the elastomer (C) in the aliphatic polyamide resin (B);
   after the kneading, mixing the kneaded product and a semi-aromatic polyamide resin (A) so as to provide a resin composition for a refrigerant-transporting hose; and
   melt-extruding the resin composition into a hose shape to form a constituent layer of the refrigerant-transporting hose according to claim 1.

5. A refrigerant-transporting hose according to claim 1, wherein, in the resin composition, the semi-aromatic polyamide resin (A) forms a matrix phase and the aliphatic polyamide resin (B) containing the uncrosslinked elastomer (C) forms an island phase.

6. A refrigerant-transporting hose according to claim 1, wherein, in the resin composition, the elastomer (C) is incorporated as particles having an average particle diameter of 0.1 to 1 μm.

7. A refrigerant-transporting hose according to claim 1, wherein, in the resin composition, a content of the component (C) is 10 to 40 wt % of a total amount of the component (B) and the component (C).

8. A refrigerant-transporting hose according to claim 1, wherein, in the resin composition, a content of the component (A) is 60 to 90 wt % of a total amount of the resin composition for the refrigerant-transporting hose.

9. A refrigerant-transporting hose according to claim 1, wherein, in the resin composition, the aliphatic polyamide resin (B) comprises at least one selected from the group consisting of a polyamide 46 (PA46), a polyamide 6 (PA6), a polyamide 66 (PA66), a polyamide 92 (PA92), a polyamide 99 (PA99), a polyamide 610 (PA610), a polyamide 612 (PA612), a polyamide 11 (PA11), a polyamide 912 (PA912), a polyamide 12 (PA12), a copolymer of the polyamide 6 and the polyamide 66 (PA6/66), and a copolymer of the polyamide 6 and the polyamide 12 (PA6/12).

10. A refrigerant-transporting hose according to claim 1, wherein, in the resin composition, the elastomer (C) comprises at least one elastomer selected from the group consisting of styrene-, olefin-, vinyl chloride-, polyester-, polyurethane-, and polyamide-based elastomers.

11. A refrigerant-transporting hose according to claim 1, wherein, in the resin composition, the elastomer (C) is incorporated substantially into the aliphatic polyamide resin (B) dispersed in a phase formed of the semi-aromatic polyamide resin (A).

12. A refrigerant-transporting hose according to claim 1, wherein the constituent layer formed of the resin composition has a thickness of 0.15 to 0.2 mm.

13. A method of producing a resin composition for a refrigerant-transporting hose, the method comprising:
kneading an aliphatic polyamide resin (B) and an elastomer (C) that is not crosslinked to finely disperse the elastomer (C) in the aliphatic polyamide resin (B); and
mixing the kneaded product and a semi-aromatic polyamide resin (A) so as to obtain the resin composition for the refrigerant-transporting hose according to claim 1, which contains the semi-aromatic polyamide resin (A) as a main component, and in which the aliphatic polyamide resin (B) is dispersed in a phase formed of the semi-aromatic polyamide resin (A) and the uncrosslinked elastomer (C) is incorporated in the form of particles into the dispersed component (B).

14. A method of producing a resin composition for a refrigerant-transporting hose according to claim 13, wherein the kneading comprises kneading the aliphatic polyamide resin (B) and the uncrosslinked elastomer (C) at a temperature in a range of 200 to 250° C. to finely disperse the elastomer (C) in the aliphatic polyamide resin (B), and the mixing comprises melting and mixing the kneaded product and the semi-aromatic polyamide resin (A) at a temperature in a range of 260 to 310° C.

* * * * *